United States Patent
Mountz et al.

(10) Patent No.: US 8,215,651 B2
(45) Date of Patent: Jul. 10, 2012

(54) STROLLER PART ASSEMBLY FOR A REVERSIBLE HANDLE STROLLER

(75) Inventors: Jonathan Mountz, Elverson, PA (US); Jonathan M. Pacella, Coatesville, PA (US)

(73) Assignee: Wonderland Nurserygoods Company Limited, Central (HK)

(*) Notice: Subject to any disclaimer, the term of this patent is extended or adjusted under 35 U.S.C. 154(b) by 248 days.

(21) Appl. No.: 12/698,778

(22) Filed: Feb. 2, 2010

(65) Prior Publication Data

US 2010/0194065 A1 Aug. 5, 2010

(51) Int. Cl.
*B62B 7/06* (2006.01)

(52) U.S. Cl. .................. 280/47.36; 280/47.38; 280/642

(58) Field of Classification Search .............. 280/47.36, 280/47.371, 47.38, 47.39, 642, 643, 647, 280/648, 650; 403/83, 92, 93, 95, 101, 102
See application file for complete search history.

(56) References Cited

U.S. PATENT DOCUMENTS

| | | | | |
|---|---|---|---|---|
| 6,102,432 | A * | 8/2000 | Cheng | 280/642 |
| 6,508,605 | B1 * | 1/2003 | Cheng | 403/83 |
| 6,629,801 | B2 * | 10/2003 | Cheng | 403/101 |
| 6,893,031 | B2 * | 5/2005 | Suzuki | 280/47.36 |
| 6,938,914 | B2 * | 9/2005 | Kassai et al. | 280/642 |
| 2002/0109336 | A1 * | 8/2002 | Suzuki | 280/647 |
| 2002/0121753 | A1 * | 9/2002 | Suzuki | 280/47.36 |
| 2007/0132207 | A1 * | 6/2007 | Moriguchi et al. | 280/642 |
| 2010/0127481 | A1 * | 5/2010 | Funakura | 280/658 |
| 2010/0156060 | A1 * | 6/2010 | Dotsey et al. | 280/47.371 |
| 2010/0194065 | A1 * | 8/2010 | Mountz et al. | 280/47.36 |

* cited by examiner

*Primary Examiner* — John R Olszewski
*Assistant Examiner* — Brodie Follman
(74) *Attorney, Agent, or Firm* — Frommer Lawrence & Haug LLP; Ronald R. Santucci (57) ABSTRACT

A stroller part assembly includes: a seat support frame; an armrest secured to the seat support frame and defining an inner space; a handle pivoted to the seat support frame so as to be rotatable about an axis relative to the seat support frame; and a lock mechanism including first and second interlocking members disposed in the inner space and secured to the armrest, and a third interlocking member mounted movably on the handle and engageable with the first and second interlocking members.

9 Claims, 8 Drawing Sheets

STROLLER PART ASSEMBLY FOR A REVERSIBLE HANDLE STROLLER

CROSS-REFERENCE TO RELATED APPLICATION

This application claims priority of U.S. Provisional Application No. 61/206,698, filed on Feb. 3, 2009, the entire contents of which are incorporated herein by reference.

BACKGROUND OF THE INVENTION

1. Field of the Invention

This invention relates to a stroller part assembly for a reversible handle stroller, more particularly to a stroller part assembly including interlocking members disposed in an armrest for locking a handle.

2. Description of the Related Art

U.S. Pat. No. 6,508,605 discloses a conventional stroller part assembly for a reversible handle stroller. The stroller part assembly includes an armrest provided with front and rear engaging projections that protrude outwardly and laterally from a side wall of the armrest, a front leg connected to the armrest, a rear leg connected to the armrest, a rear support connected to the rear leg and further connected to the armrest, a handle pivoted to the rear support and rotatable relative to the rear support and the armrest between front and rear positions, a lock mechanism including a spring-biased latch that is mounted slidably on the handle for engaging one of the front and rear engaging projections, and a pulling string for pulling the lock mechanism to slide upwardly along the handle. In operation, when the handle is to be moved from the rear position to the front position, the string is pulled so as to disengage the latch from the rear engaging projection, followed by rotating the handle from the rear position to the front position and then releasing the string from the pulling to allow the latch to engage the front engaging projection. However, since the front engaging projection protrudes from the armrest in an area where a child's hand will generally rest, operation of moving the handle from the rear position to the front position may result in pinching the fingers of the child. In addition, since the front and rear engaging projections protrude outwardly from the armrest, the appearance of the armrest is adversely affected.

SUMMARY OF THE INVENTION

Therefore, an object of the present invention is to provide a stroller part assembly that can overcome the aforesaid drawbacks associated with the prior art.

According to the present invention, there is provided a stroller part assembly for a reversible handle stroller. The stroller part assembly comprises: a seat support frame; an armrest having an inner space and secured to the seat support frame; a handle pivoted to the seat support frame so as to be rotatable about an axis relative to the seat support frame; and a lock mechanism including first, second and third interlocking members. The first and second interlocking members are disposed in the inner space, are secured to the armrest, and are spaced apart from each other. The third interlocking member is mounted movably on the handle and is releasably engageable with the first and second interlocking members so as to secure releasably the handle to the seat support frame at a desired position.

BRIEF DESCRIPTION OF THE DRAWINGS

In drawings which illustrate embodiments of the invention.

DETAILED DESCRIPTION OF THE PREFERRED EMBODIMENT

FIGS. 1 to 6 illustrate the preferred embodiment of a stroller part assembly of a reversible handle stroller according to the present invention.

The stroller part assembly includes: a seat support frame 2; an armrest 3 secured to the seat support frame 2 and including a top wall 31 and two opposite side walls 32 extending downwardly and respectively from two opposite sides of the top wall 31, the top wall 31 cooperating with the side walls 32 to define an inner space 30 thereamong; a handle 4 pivoted to the seat support frame 2 so as to be rotatable about an axis (X) relative to the seat support frame 2 between first and second angular positions; and a lock mechanism including first and second interlocking members 51, 52 disposed in the inner space 30, spaced apart from each other and secured to the armrest 3, and a third interlocking member 53 mounted movably on the handle 4 so as to be movable relative to the handle 4 between a locking position (see FIG. 4) and an unlocking position (see FIG. 5) and having a latch portion 531 releasably engageable with the first and second interlocking members 51, 52 so as to secure releasably the handle 4 to the seat support frame 2 at a desired position. The latch portion 531 of the third interlocking member 53 extends into the inner space 30 and engages releasably the first interlocking member 51 when the handle 4 is disposed at the first angular position and when the third interlocking member 53 is disposed at the locking position, thereby locking the handle 4 against movement relative to the seat support frame 2. The latch portion 531 of the third interlocking member extends into the inner space 30 and engages releasably the second interlocking member 52 when the handle 4 is disposed at the second angular position and when the third interlocking member 53 is disposed at the locking position, thereby locking the handle 4 against movement relative to the seat support frame 2. The latch portion 531 of the third interlocking member 53 disengages the first interlocking member 51 when the handle 4 is disposed at the first angular position and when the third interlocking member 53 is disposed at the unlocking position, thereby permitting movement of the handle 4 relative to the seat support frame 2. The latch portion 531 of the third interlocking member 53 disengages the second interlocking member 52 when the handle 4 is disposed at the second angular position and when the third interlocking member 53 is disposed at the unlocking position, thereby permitting movement of the handle 4 relative to the seat support frame 2.

The top wall 31 further cooperates with the side walls 32 to define a bottom opening 301 in spatial communication with the inner space 30. The latch portion 531 of the third interlocking member 53 extends upwardly through the bottom opening 301 into the inner space 30 of the armrest 3 for engaging one of the first and second interlocking members 51, 52.

The third interlocking member 53 further has a sleeve portion 532 sleeved slidably on the handle 4 and having a bottom end 5321. The latch portion 531 is juxtaposed and cooperates with the sleeve portion 532 to define a gap 530 therebetween, and has a bent bottom end 5311 connected to the bottom end 5321 of the sleeve portion 532. One of the side walls 32 of the armrest 3 extends into the gap 530.

The lock mechanism further includes an urging member 54 biasing the third interlocking member 53 for restoring the third interlocking member 53 from the unlocking position to the locking position.

The first interlocking member 51 includes a first shaft 511 disposed in the inner space 30, connected to the armrest 3 and parallel to the axis (X). The second interlocking member 52 includes a second shaft 521 disposed in the inner space 30, connected to the armrest 3 and parallel to the first shaft 511. The seat support frame 2 includes a first support rod 21 extending into the inner space 30 and connected to the first shaft 511, and a second support rod 22 extending into the inner space 30 and connected to the second shaft 521. The handle 4 is pivoted to the first support rod 21.

The latch portion 531 of the third interlocking member 53 further has an upper end 5312 opposite to the bottom end 5311 of the latch portion 531 and formed with a cutout 5310. The first shaft 511 extends through the cutout 5310 when the handle 4 is disposed at the first angular position and when the third interlocking member 53 is disposed at the locking position. The second shaft 521 extends through the cutout 5310 when the handle 4 is disposed at the second angular position and when the third interlocking member 53 is disposed at the locking position.

The first and second shafts 511, 521 are provided with first and second spacers 512, 522 sleeved thereon, respectively, for engaging the cutout 5310 in the upper end 5312 of the latch portion 531. Preferably, the sleeve portion 532 is made from a plastic material, and the latch portion 531 is made from a steel plate. The bottom end 5321 of the sleeve portion 532 is formed with a retaining slot 5322. The bent bottom end 5311 of the latch portion 531 has a U-shaped configuration, and is fitted securely into the retaining slot 5322 in the sleeve portion 532.

Figure 1:
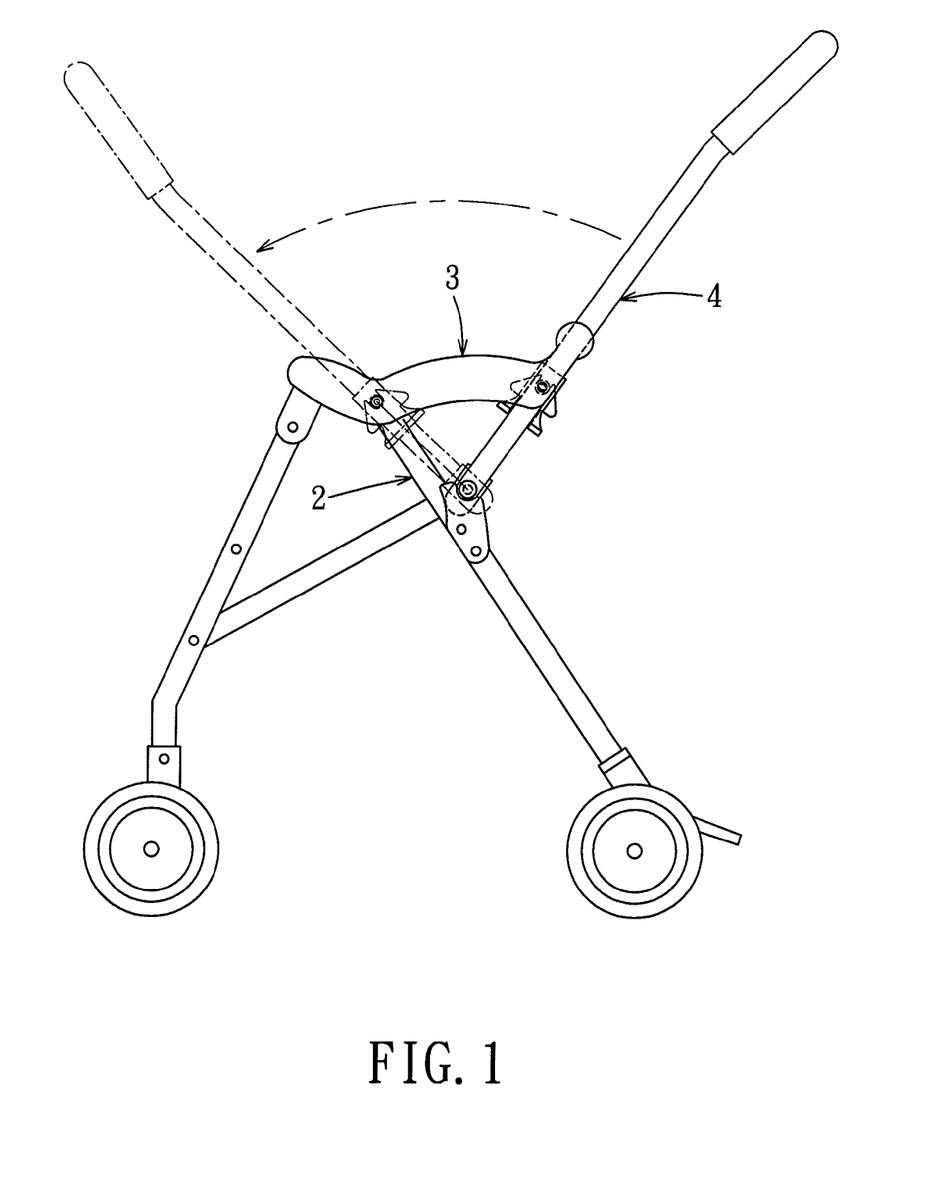
FIG. 1 is a side view of the preferred embodiment of a stroller part assembly of a stroller according to the present invention.
Figure 2:
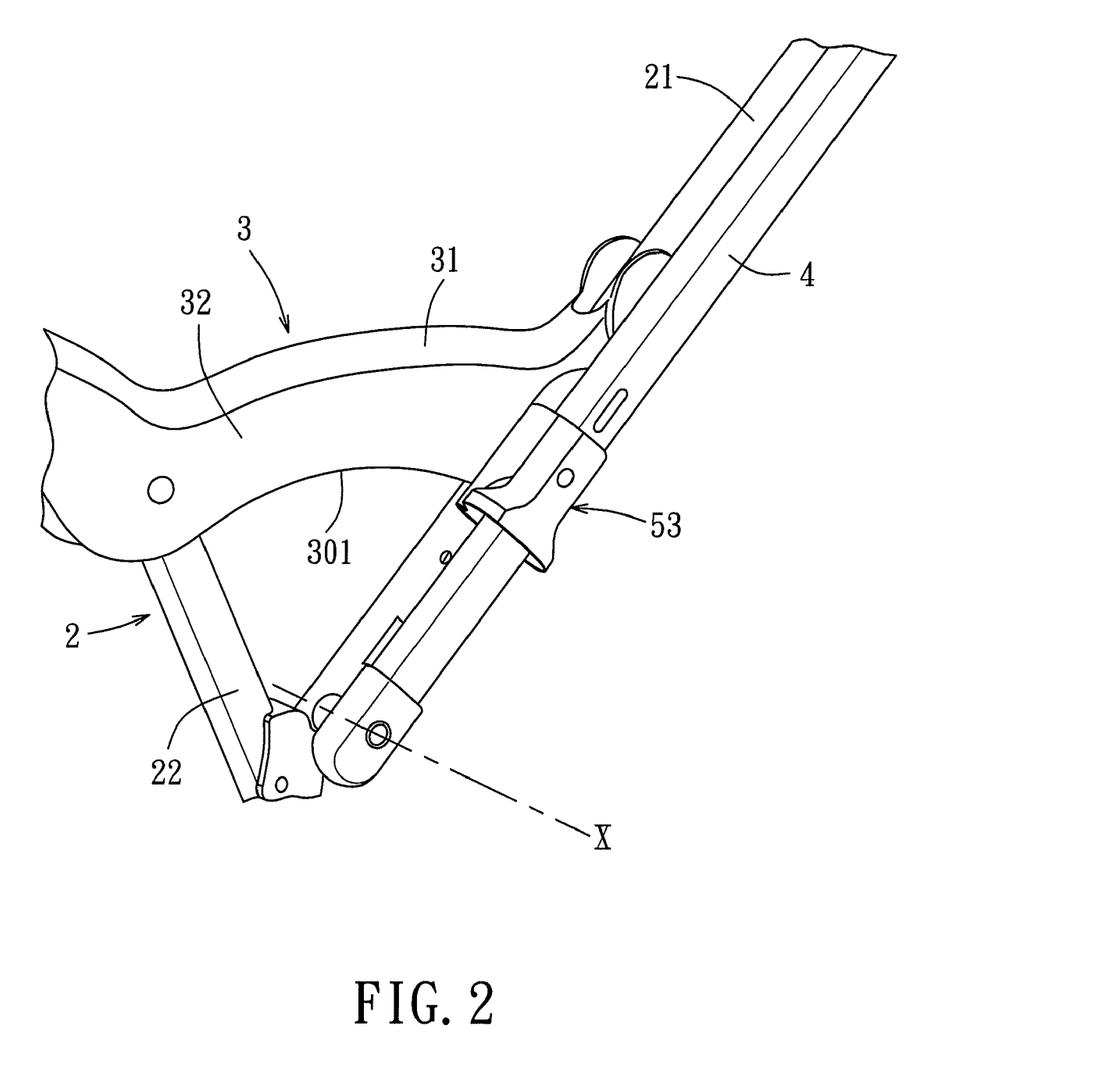
FIG. 2 is a fragmentary perspective view of the preferred embodiment, illustrating a state where a handle is disposed at a first position.
Figure 3:
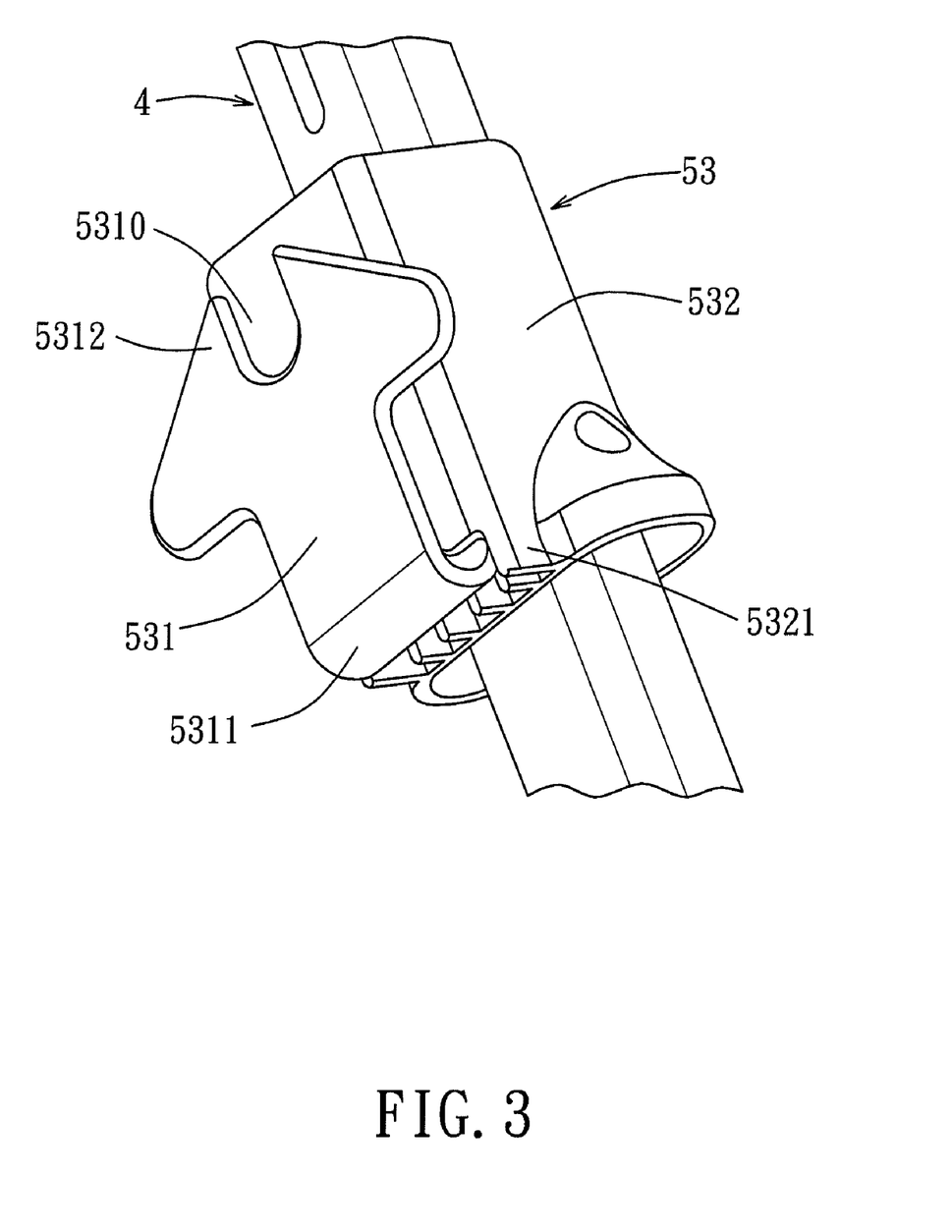
FIG. 3 is a fragmentary perspective view to illustrate the configuration of an interlocking member of the preferred embodiment.
Figure 4:
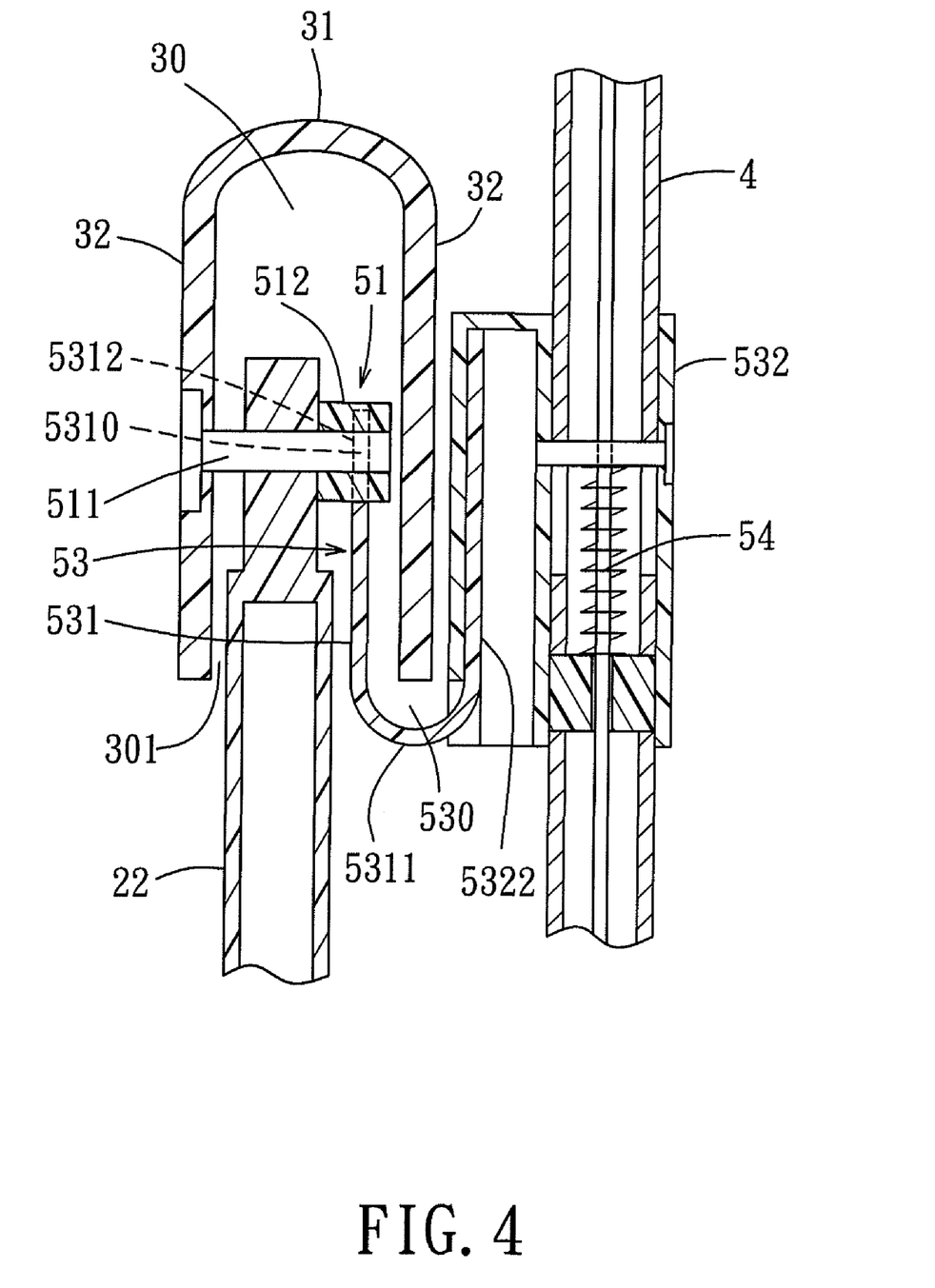
FIG. 4 is a fragmentary partly sectional view to illustrate a state where the interlocking member of the preferred embodiment is disposed at a locking position.
Figure 5:
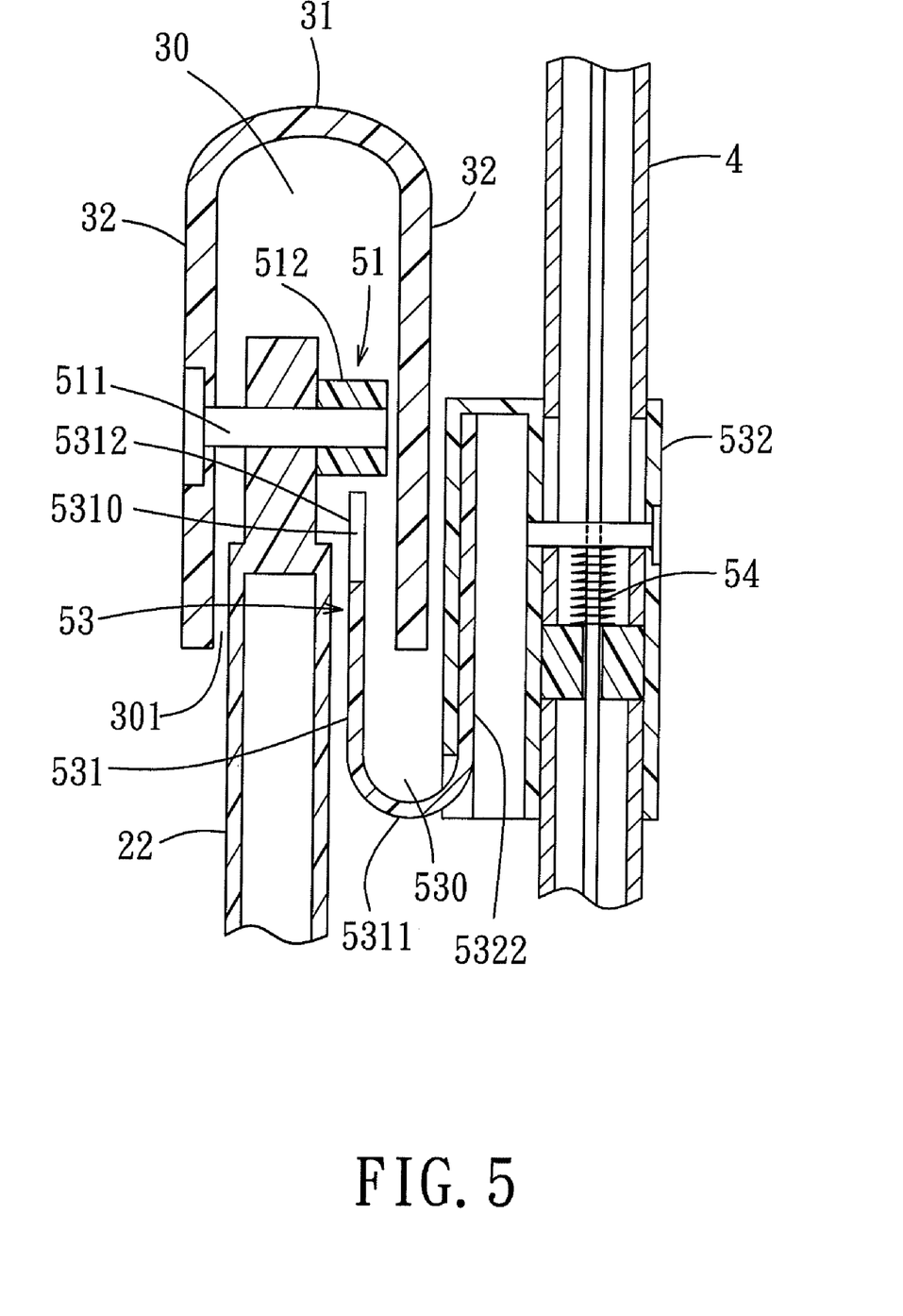
FIG. 5 is a fragmentary partly sectional view to illustrate a state where the interlocking member of the preferred embodiment is disposed at an unlocking position.
Figure 6:
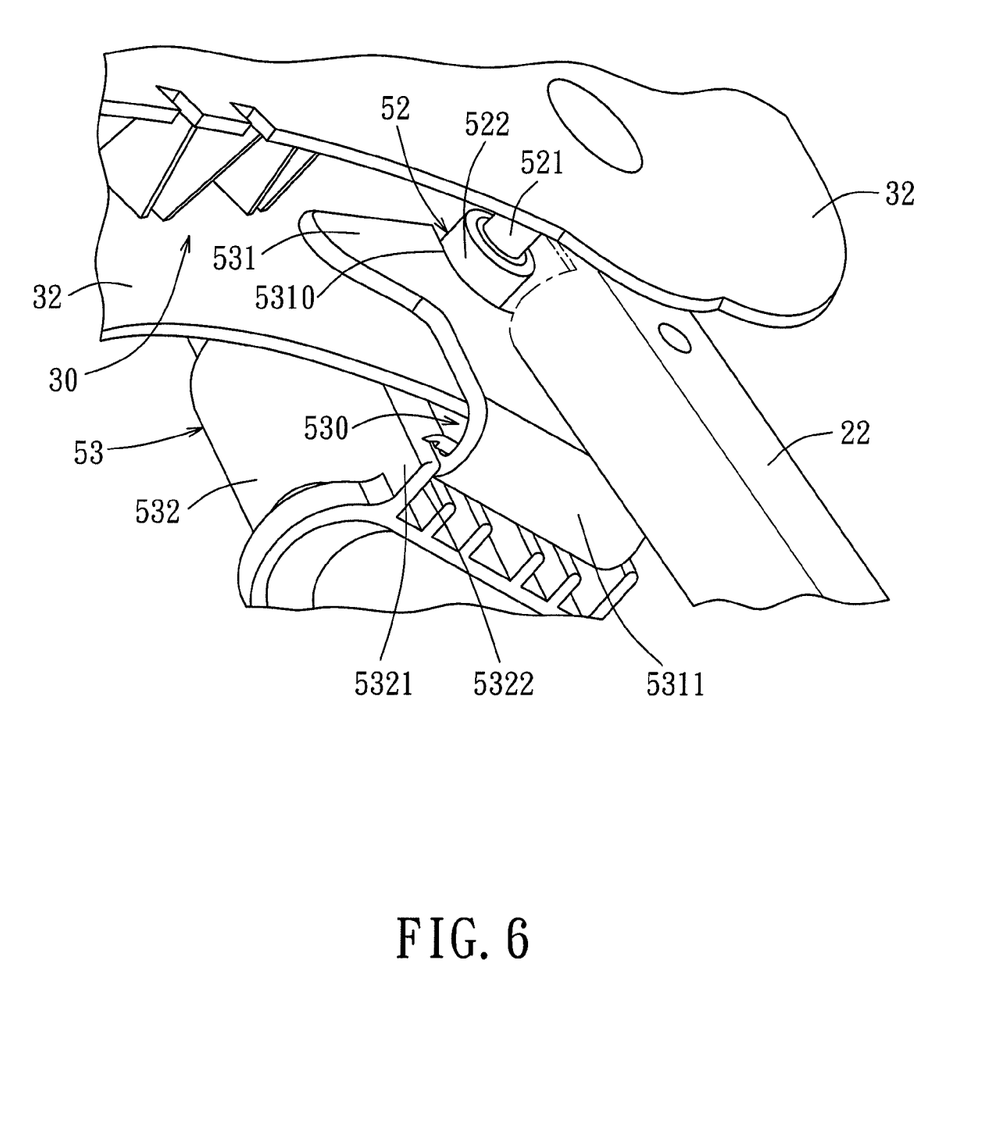
FIG. 6 is a fragmentary perspective view of the preferred embodiment.
Figure 7:
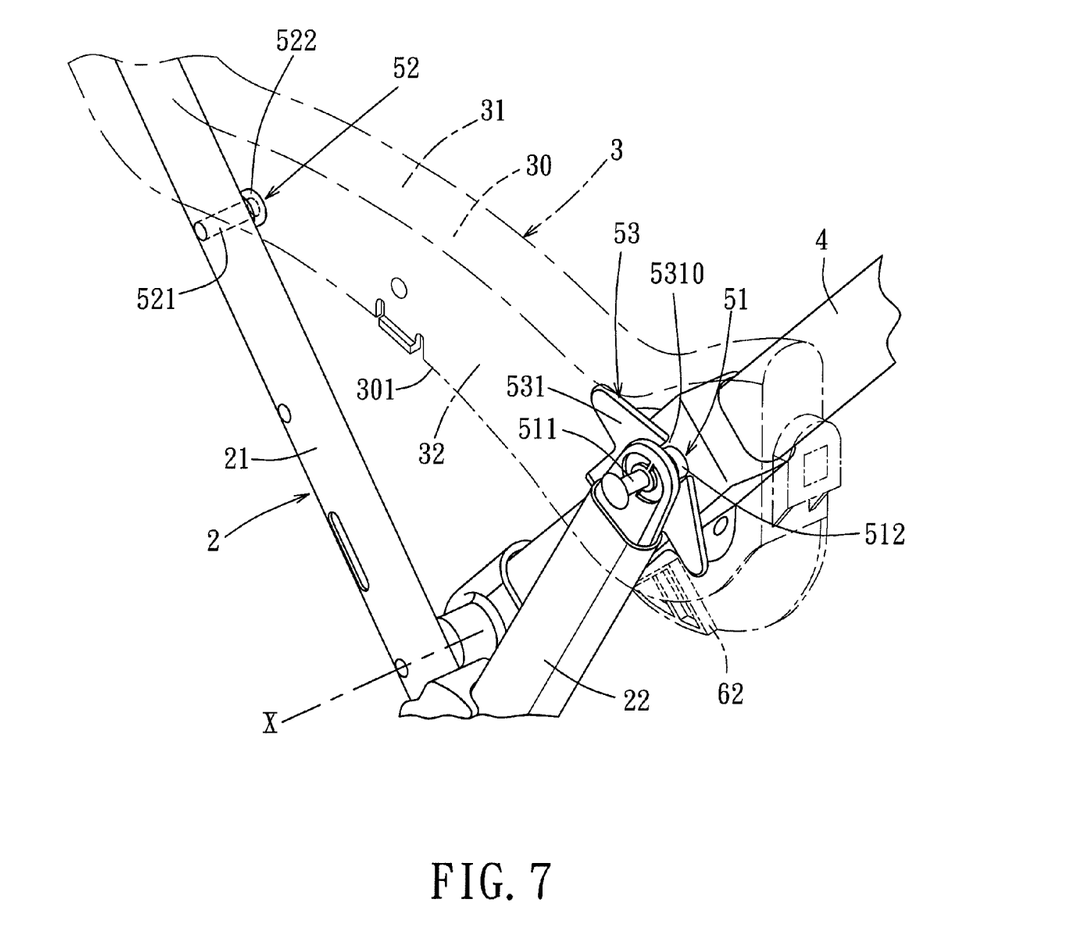
FIG. 7 is a fragmentary perspective view of the preferred embodiment.
Figure 8:
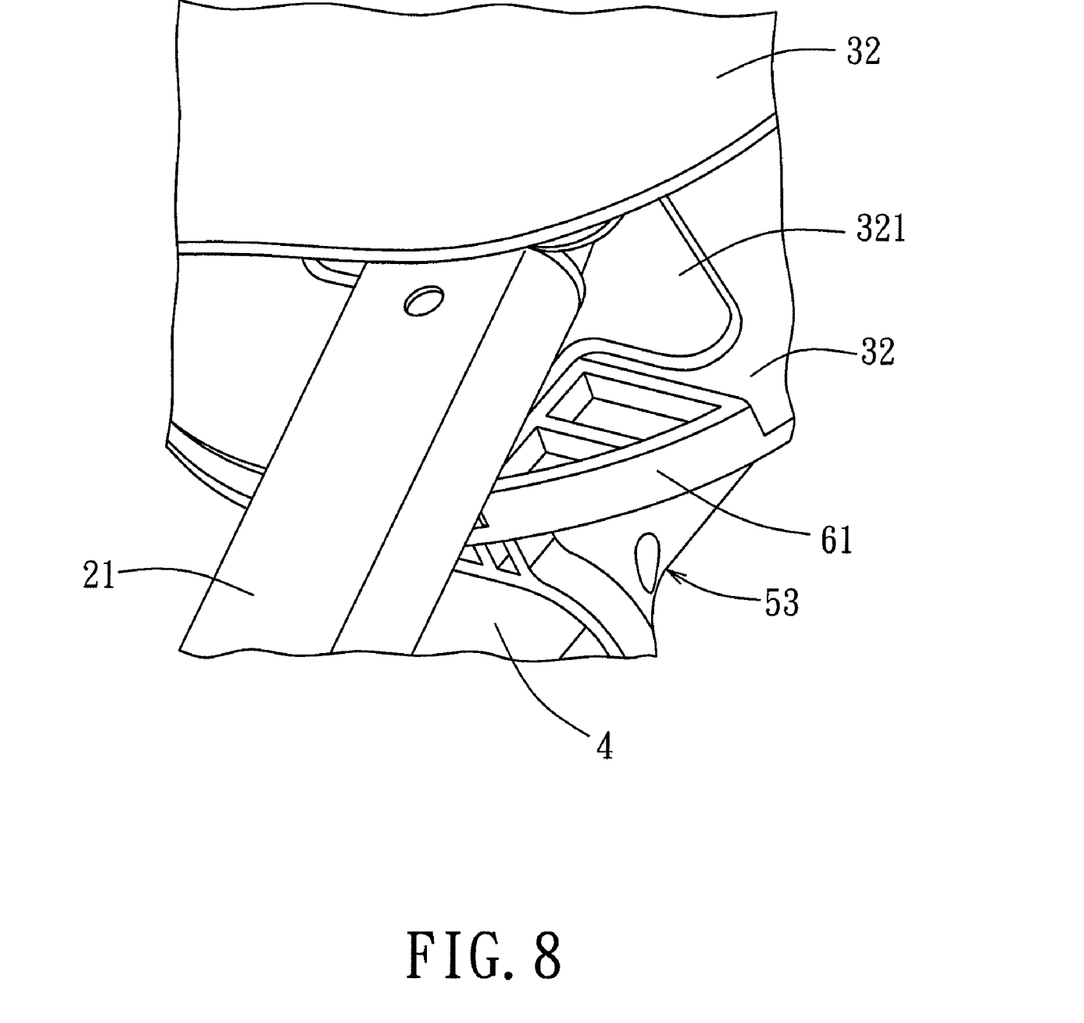
FIG. 8 is a fragmentary perspective view to illustrate how the interlocking member is blocked by a stopper of the preferred embodiment.

The armrest 3 is provided with first and second stoppers 61, 62 (see FIGS. 7 and 8) that protrude from an inner surface of one of the side walls 32 into the inner space 30 and that are disposed adjacent to the first and second interlocking members 51, 52, respectively, for blocking the third interlocking member 53, thereby blocking the handle 4 against further movement beyond the first and second angular positions.

By disposing the first and second interlocking members 51, 52 and the latch portion 531 of the third interlocking member 53 in the inner space 30 of the armrest 3 of the stroller part assembly of this invention, the aforesaid drawbacks associated the prior art can be eliminated.

With the invention thus explained, it is apparent that various modifications and variations can be made without departing from the spirit of the present invention.

What is claimed is:

1. A stroller part assembly for a reversible handle stroller, comprising:
   a seat support frame;
   an armrest having an inner space and secured to said seat support frame;
   a handle pivoted to said seat support frame so as to be rotatable about an axis relative to said seat support frame; and
   a lock mechanism including first, second and third interlocking members, said first and second interlocking members being disposed in said inner space, being secured to said armrest, and being spaced apart from each other, said third interlocking member being mounted movably on said handle and being releasably engageable with said first and second interlocking members so as to secure releasably said handle to said seat support frame at a desired position,
   wherein said armrest includes a top wall and two opposite side walls extending downwardly and respectively from two opposite sides of said top wall, said top wall cooperating with said side walls to define said inner space thereamong.

2. The stroller part assembly of claim 1, wherein said handle is rotatable about the axis between first and second angular positions, said third interlocking member extending into said inner space and engaging releasably said first interlocking member when said handle is disposed at the first angular position and when said third interlocking member is disposed at a locking position, said third interlocking member extending into said inner space and engaging releasably said second interlocking member when said handle is disposed at the second angular position and when said third interlocking member is disposed at the locking position.

3. The stroller part assembly of claim 2, wherein said top wall further cooperates with said side walls to define a bottom opening in spatial communication with said inner space, said third interlocking member having a latch portion extending upwardly through said bottom opening into said inner space for engaging one of said first and second interlocking members.

4. The stroller part assembly of claim 1, wherein said lock mechanism further includes an urging member biasing said third interlocking member for restoring said third interlocking member from an unlocking position to the locking position.

5. The stroller part assembly of claim 3, wherein said third interlocking member further has a sleeve portion sleeved slidably on said handle and having a bottom end, said latch portion being juxtaposed and cooperating with said sleeve portion to define a gap therebetween, and having a bottom end connected to said bottom end of said sleeve portion, one of said side walls of said armrest extending into said gap.

6. The stroller part assembly of claim 5, wherein said first interlocking member includes a first shaft disposed in said inner space, connected to said armrest and parallel to the axis, said second interlocking member including a second shaft disposed in said inner space, connected to said armrest and parallel to said first shaft, said seat support frame including a first support rod extending into said inner space and connected to said first shaft, and a second support rod extending into said inner space and connected to said second shaft, said handle being pivoted to said first support rod.

7. The stroller part assembly of claim 6, wherein said latch portion of said third interlocking member further has an upper end opposite to said bottom end of said latch portion and formed with a cutout, said first shaft extending through said cutout when said handle is disposed at the first angular position and when said third interlocking member is disposed at the locking position, said second shaft extending through said cutout when said handle is disposed at the second angular position and when said third interlocking member is disposed at the locking position.

8. The stroller part assembly of claim 7, wherein each of said first and second shafts is provided with a spacer sleeved thereon for engaging said cutout in said upper end of said latch portion.

9. The stroller part assembly of claim 2, wherein said armrest is provided with first and second stoppers that protrude from one of said side walls into said inner space and that are disposed adjacent to said first and second interlocking members, respectively, for blocking said third interlocking member, thereby blocking said handle against further movement beyond the first and second angular positions.

* * * * *